United States Patent
Irish et al.

Patent Number: 5,709,132
Date of Patent: Jan. 20, 1998

[54] CABLE LENGTH ADJUSTMENT MECHANISM

[75] Inventors: Allen G. Irish, Flint; Grant Webb, Howell, both of Mich.

[73] Assignee: Telefex Incorporated, Troy, Mich.

[21] Appl. No.: 681,228

[22] Filed: Jul. 22, 1996

[51] Int. Cl.$^6$ .................................................. F16C 1/10
[52] U.S. Cl. .................. 74/502.4; 74/502.6; 74/501.5 R
[58] Field of Search ................... 74/500.5, 501.5 R, 74/502, 502.4, 502.6, 503

[56] References Cited

U.S. PATENT DOCUMENTS

| | | | |
|---|---|---|---|
| 3,710,645 | 1/1973 | Bennet | 74/502.4 |
| 4,841,806 | 6/1989 | Spearce | 74/501.5 R |
| 5,295,408 | 3/1994 | Nagle et al. | 74/502.6 |
| 5,398,566 | 3/1995 | Moore | 74/502.4 |

*Primary Examiner*—Rodney H. Bonck
*Assistant Examiner*—Saul J. Rodriguez
*Attorney, Agent, or Firm*—Howard & Howard

[57] ABSTRACT

A motion transmitting remote control assembly (10) comprises a protective tubular conduit (12) and a flexible motion transmitting core element (14) slidably disposed in the conduit (12) for conveying longitudinal forces. A length adjuster (18) adjusts the longitudinal length of the core element (14). The length adjuster (18) includes a housing (20) having a plurality of transverse teeth (22), and a slider (26) which is longitudinally moveable within a track (24) of the housing (20) between maximum and minimum length adjusted positions. A toothed interlock (36) is transversely movable relative to the slider (26) between a shipping condition in which its teeth (44) are disengaged from the teeth (22) of the housing (20) and an engaged condition in which its teeth (44) engage the teeth (22) of the housing (20). A cantilever tang (48) within the interlock (36) is effectively isolated from the longitudinal forces of the core element (14) for automatically restraining the interlock (36) in the locked condition and selectively releasing the interlock (36) to return to the shipping condition for service or readjustment. The cantilever tang (48) has a cam foot (50) which seats in a stop groove (54) of the slider (26) when the interlock (36) is in the shipping condition and seats behind a rear edge (56) of the slider (26) when the interlock (36) is in the engaged condition. The blade of a screw driver (60) or the like can be used to pry the cantilever tang (48) upwardly so that its cam foot (50) unseats from behind the rear edge (56), thereby permitting service and readjustment without damaging the assembly (10) so that it can be reused.

20 Claims, 2 Drawing Sheets

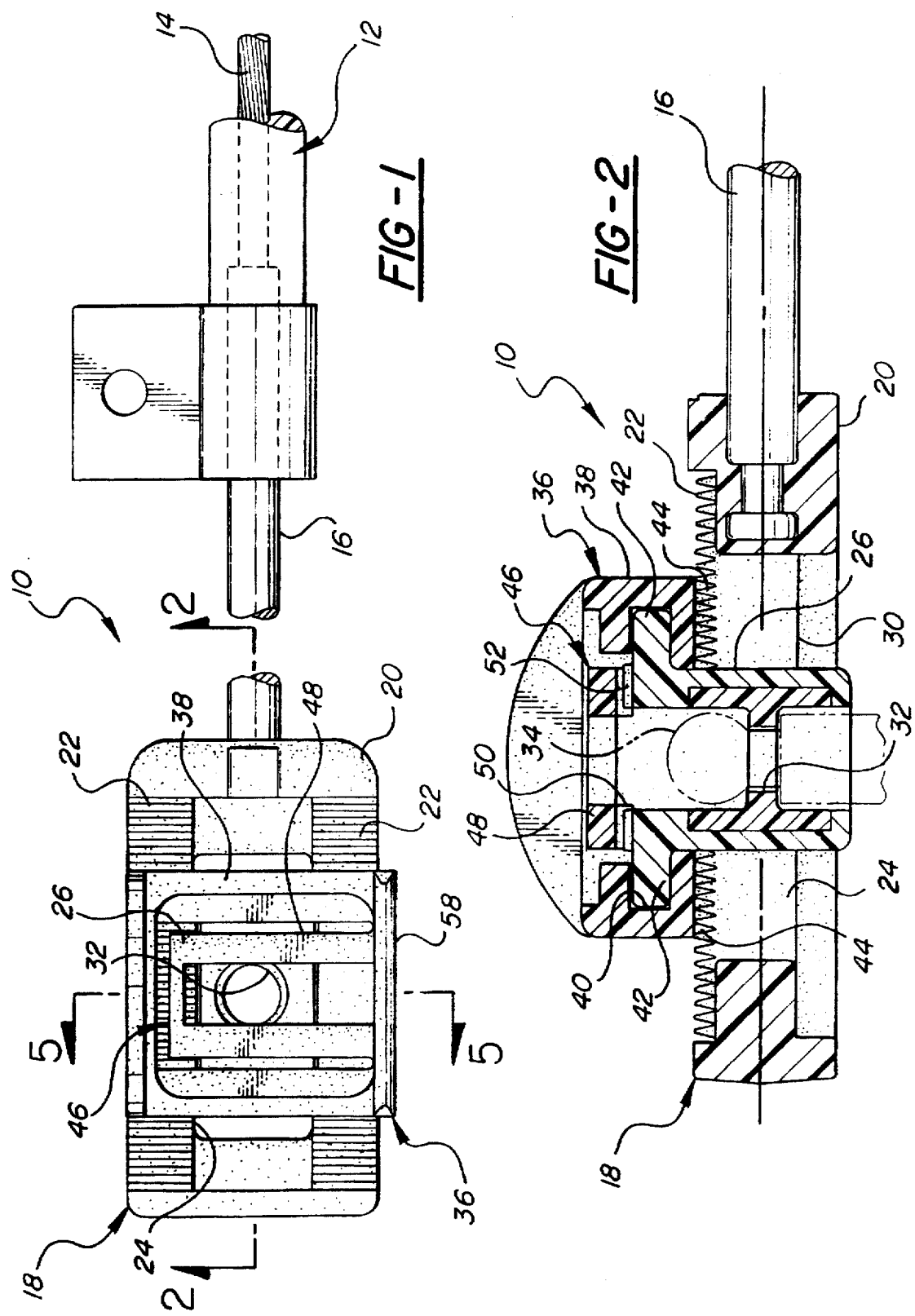

CABLE LENGTH ADJUSTMENT MECHANISM

TECHNICAL FIELD

The subject invention relates generally to a motion transmitting remote control assembly of the type for transmitting forces along a curved path, and more specifically to an improved length adjustment mechanism therefor.

BACKGROUND OF THE INVENTION

Motion transmitting remote control assemblies of the type for transmitting motion in a curved path by means of a flexible motion transmitting core element are frequently used in automotive applications to control the movement of a device from a remote location. For example, the air intake valve of an internal combustion engine is typically controlled from either a foot pedal or hand lever. Other examples include the remote manipulation of transmissions, ventilation systems, fuel doors, and hood releases via a motion transmitting remote control assembly. Such motion transmitting remote control assemblies may comprise a protective sheath-like conduit which slidably supports an internal moving core element. The conduits are often of the composite type having an inner tubular liner defining the internal boundaries of a core passage, at least one metallic supportive lay wire wrapped helically about the liner, and an outer cover disposed about the lay wire. Alternatively, the conduit may be of the more traditional Bowden type construction. The core element may be either a single wire or a multi-stranded cable.

Because of the inevitable dimensional variations occurring in any complex manufactured assembly, it is necessary to incorporate a length adjustment feature into the remote control assembly. That is, the length adjustment feature is provided to prevent slack or over-tension in the remote control assembly, and also to ease the assembly process. As those skilled in the art will readily appreciate, length adjustment features may take nearly any form. However, for applications requiting relatively high longitudinal force transfer, such as when remotely controlling an automatic transmission, the prior art has taught to establish a series of transversely extending teeth on a rectangular housing, and position a slider internally of the housing with an interlock member having teeth of its own transversely slidable to an engaged condition with the housing to effectively lock the slider in a fixed position relative to the housing.

One example of such a prior art remote control assembly may be found in U.S. Pat. No. 5,398,566 to Moore, issued Mar. 21, 1996 and assigned to the assignee of the subject invention. This assembly includes a detent feature for automatically restraining the interlock in the engaged condition to prevent inadvertent removal therefrom during operation. However, the detent must be irreparably broken to return the interlock to its shipping condition if service is required on the controlled device. Hence, the assembly cannot be readjusted or reused after service.

SUMMARY OF THE INVENTION AND ADVANTAGES

A motion transmitting remote control assembly of the type for transmitting forces along a curved path comprises a protective tubular conduit and a flexible motion transmitting core element slidably disposed in the conduit for conveying longitudinal forces therealong. A length adjuster is provided for adjusting the longitudinal length of either the conduit or the core element. The length adjuster includes a housing having a plurality of transverse teeth, and a slider longitudinally moveable within the housing between maximum and minimum length adjusted positions. An interlock has at least one tooth and is transversely movable relative to the slider between a shipping condition in which its tooth is disengaged from the teeth of the housing and an engaged condition in which its tooth engages the teeth of the housing to transfer longitudinal forces therebetween. The improvement of the subject invention comprises a serviceable retainer means which is isolated from the longitudinal forces for automatically restraining the interlock in the locked condition and selectively releasing the interlock to return to the shipping condition without unfavorable effects resulting from the longitudinal forces.

The serviceable retainer means allows the interlock to be conveniently returned to its shipping condition if service is required on the controlled device. However, because the serviceable retainer means is isolated from longitudinal forces when in the engaged condition, foreseeable operational stresses will not result in inadvertent release from the engaged condition. In this manner, the assembly can be readjusted and reused after service.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is top view of a motion transmitting remote control assembly according to the subject invention showing the interlock in the engaged condition;

FIG. 2 is a cross-sectional view taken along lines 2—2 of FIG. 1;

DETAILED DESCRIPTION OF THE PREFERRED EMBODIMENT

Figure 3:
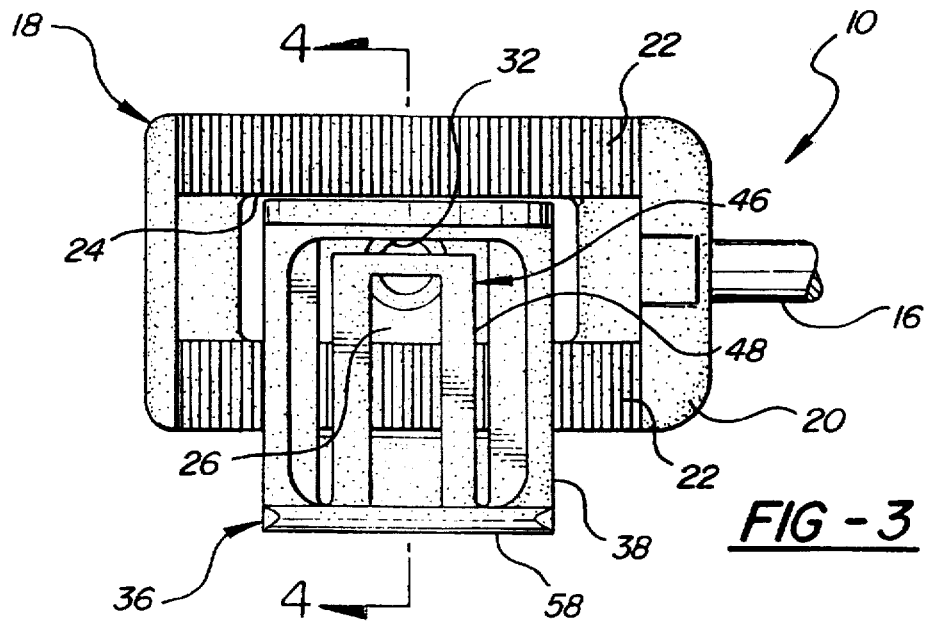
FIG. 3 is a top view as in FIG. 1 but showing the interlock in the shipping condition.

Referring to the Figures, wherein like numerals indicate like or corresponding parts throughout the several views, a motion transmitting remote control assembly is generally shown at 10. The assembly 10 is of the type including a flexible conduit, generally indicated at 12, having a pair of spaced apart ends, only one of which is shown in FIG. 1. The conduit 12 is preferably of the composite type having an inner tubular liner defining the internal boundaries of a core passage, at least one metallic supportive lay wire wrapped helically about the liner, and an outer cover disposed about the lay wire.

A flexible core element 14 is slidably disposed in the conduit 12 for conveying longitudinal forces therealong. The core element 14 extends from both ends of the conduit 12 and attaches, respectively, to controlling and controlled members. For example, the controlling end of the core element 14 may be connected to a shift lever (not shown) in the passenger compartment, whereas the controlled end of the core element 14 may be connected to the automatic transmission (also not shown). In the forgoing example where the core element 14 is required to transmit both tensile and compressive forces, a rigid extension 16 is fixedly connected to the end of the core element 14 to provide column strength. In such circumstances, it is customary to encase a portion of the rigid extension 16 in a swivel tube as will become apparent to those skilled in the art. Of course, other applications of a motion transmitting remote control assembly which includes a conduit 12 and a core element 14 are possible without departing from the invention as defined in the appended claims, and that many various alternative configurations of the preferred embodiment disclosed herein are likewise possible.

Because of the inevitable dimensional variations between controlling and controlled devices in a typical motor vehicle, a length adjuster, generally indicated at 18, is provided for adjusting the longitudinal length of the core element 14. Those skilled in the art will appreciate that the length adjuster 18 can be readily modified to adjust the length of the conduit 12 instead of the core element 14 to accomplish essentially the same results. The length adjuster 18 prevents slack or over-tension in the remote control assembly 10, relaxes the dimensional controls observed during fabrication of the assembly 10, and also simplifies the vehicle installation process.

The length adjuster 18 includes a housing 20 having a plurality of transverse teeth 22. As best shown in FIGS. 1 and 3, the housing 20 has a generally rectangular shape including an interior track 24 extending in the longitudinal direction. The teeth 22 run perpendicularly to the track 24 and are positioned on flanking sides of the track 24. In the preferred embodiment, the rigid extension 16 of the core element 14 is embedded in the housing 20, as by an overmolding operation. In this manner, the housing 20 and core element 14 are integrally secured to one another.

Figure 4:
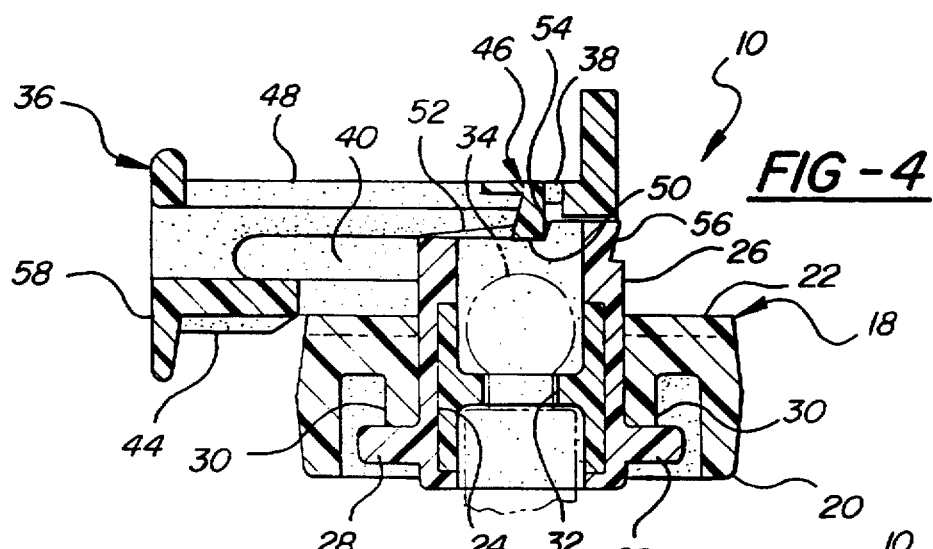
FIG. 4 is a cross-sectional view taken along lines 4—4 of FIG. 3.
Figure 5:
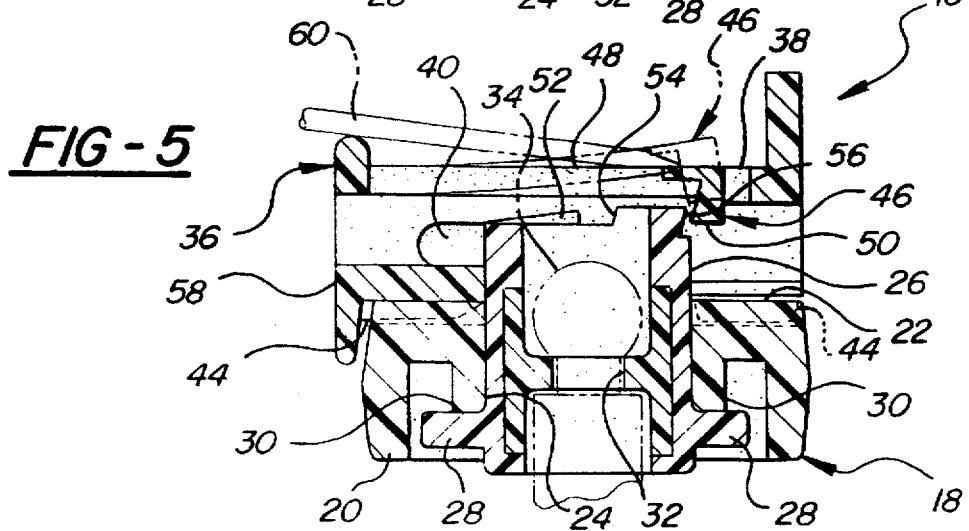
FIG. 5 is a cross-sectional view taken along lines 5—5 of FIG. 1.

The length adjuster 18 further includes a slider 26 longitudinally moveable within the track 24 of the housing 20. As best shown in FIGS. 4 and 5, the slider 26 rides with a sliding clearance in the track 24. The slider 26 is restrained against pulling upwardly through the track 24 by a pair of opposing transverse tabs 28 which abut depending flanges 30 of the housing 20. In this manner, the slider 26 is free to travel longitudinally back and forth in the track 24 between maximum and minimum length adjusted positions. The maximum length adjusted position, defined by the end of the track 24 distal the rigid extension 16 of the core element 14, establishes the maximum length to which the core element 14 can be adjusted by the length adjuster 18. Conversely, the minimum length adjusted position, defined by the end of the track 24 proximate the rigid extension 16 of the core element 14, establishes the minimum length to which the core element 14 can be adjusted by the length adjuster 18.

The slider 26 includes a terminal receptacle 32 which, in the preferred embodiment, is insert molded in position. A ball stud 34, shown in phantom, or other type connector, extends from the controlled member such as an automatic transmission. The receptacle 32 is preferably made from a relatively flexible material to facilitate self-locking connection to the ball stud 34 and to attenuate vibrations therebetween to some degree.

An interlock, generally indicated at 36, is transversely movable relative to the slider 26. The interlock 36 comprises a square-shaped frame 38 internally forming a pair of opposing slide ways 40. The frame 38 slidably surrounds the slider 26 in transverse directions between a shipping condition, as shown in FIGS. 3 and 4, and an engaged condition, as shown in FIGS. 1 and 5. The slider 26 includes a pair of opposing lateral tabs 42 slidably disposed one each in the respective slide ways 40 of the frame 38. The interlock 36 slides against the upper surface of the housing 20, so that the slider 26 is held in the track 24 via its lateral 42 and transverse 28 tabs.

The interlock 36 has a plurality of teeth 44 which are disengaged, i.e., spaced, from the teeth 22 of the housing 20 when the interlock is in the shipping condition of FIGS. 1 and 5. This allows free sliding movement of the slider 26 in the track 24 between the maximum and minimum length adjusted positions as described above. However, when the interlock is manually shifted to the engaged condition as shown in FIGS. 3 and 4, its teeth 44 engage the teeth 22 of the housing 20 to transfer longitudinal forces therebetween and thus manipulate the controlled member which in the example thus given is an automatic transmission. As the inner edges of the frame 38 bear directly against the slider 26, shown in FIG. 2, the transfer of longitudinal forces pass from the core element 14, to the rigid extension 16, to the housing 20, to the frame 38 of the interlock 36, to the slider 26, and finally to the ball stud 34, and vice versa.

A serviceable retainer means, generally indicated at 46, is provided for automatically restraining the interlock 36 in the engaged condition and selectively releasing the interlock 36 to return to the shipping condition. The serviceable retainer means 46 is effectively isolated from the longitudinal forces transmitted between the core element 14 and the ball stud 34 without unfavorable effects resulting from the longitudinal forces. The serviceable retainer means 46 includes a cantilevered tang 48 extending integrally from the one lateral interior edge of the frame 38, best shown in FIGS. 1 and 3. The cantilever tang 48 is entirely surrounded by the frame 38 and is formed in a generally squared off U-shape with the base of the "U" comprising the deflectable end. A cam foot 50 is positioned on the deflectable end of the cantilever tang 48, with a wedge-shaped profile as shown in FIGS. 4 and 5.

The upper surface of the slider 26 includes a ramping retainer surface 52 which interacts with the cam foot 50 of the cantilever tang 48 to restrain the interlock 36 in each of the shipping and engaged conditions. More specifically, the ramping retainer surface 52 includes a stop groove 54 for holding the interlock 36 in the shipping condition (FIG. 4), and a rear edge 56 for holding the interlock 36 in the engaged condition (FIG. 5). That is, in the shipping condition, the cam foot 50 is seated in the stop groove 54, which prevents the interlock 36 from being disassembled from the slider 26, and which provides a degree of resistance to advancing movement of the interlock 36 toward the engaged condition. However, this degree of resistance can be overcome by the application of deliberate pressure on the thumb surface 58 of the interlock 36, causing the interlock 36 to slide transversely over the slider 26 and the cam foot 50 to slip out of the stop groove 54. Once the interlock 36 reaches its engaged condition, the cam foot 50 drops over the backwardly angled rear edge 56 of the ramping retainer surface 52 of the slider 26, thus precluding withdrawal of the interlock 36 toward the shipping condition.

However, a simple tool 60, such as the blade of a screwdriver, can be used to pry the cantilever tang 48 upwardly, so that the cam foot 50 clears the rear edge 56 of the ramping retainer surface 52, thus allowing the interlock 36 to be returned to the shipping condition. It will be appreciated that the cantilever tang 48 is practically isolated from the longitudinal forces transferred between the core element 14 and the ball stud 34, as such forces will not tend to dislodge the cam foot 50 from its seated position behind the rear edge 56 of the ramping retainer surface 52. Although, the length adjuster 18 is fully serviceable in the event it becomes necessary to disconnect from the ball stud 34 or readjust the effective length of the core element 14. However, the strength and durability of the length adjuster 18 is not compromised in any way by the serviceable retainer means 46.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A motion transmitting remote control assembly (10) for transmitting forces along a curved path, said assembly (10) comprising:

a protective tubular conduit (12);

a flexible motion transmitting core element (14) slidably disposed in said conduit (12) for conveying longitudinal forces therealong;

a length adjuster (18) for adjusting the longitudinal length of one of said conduit (12) and said core element (14);

said length adjuster (18) including a housing (20) having a plurality of transverse teeth (22), and a slider (26) longitudinally moveable within said housing (20) between maximum and minimum length adjusted positions; said slider (26) including a stop groove (54);

an interlock (36) comprising a frame (38) peripherally defining a generally open interior region, said frame (38) having at least one tooth (44) transversely movable relative to said slider (26) between a shipping condition in which said tooth (44) is disengaged from said teeth (22) of said housing (20) and an engaged condition in which said tooth (44) engages said teeth (22) of said housing (20) to transfer longitudinal forces therebetween;

and characterized by said frame (38) including a serviceable cantilever tang (48) extending into said interior region and having a cam foot (50) isolated from said longitudinal forces for automatically restraining said frame (38) in said engaged condition when said cam foot (50) is seated in said stop groove (54) and selectively releasing said frame (38) by unseating said cam foot (50) from said stop groove (54) to return to said shipping condition without unfavorable influences resulting from said longitudinal forces; said cantilever tang (48) thereof.

2. An assembly (10) as set forth in claim 1 wherein said slider (26) includes a ramping retainer surface (52) adjacent said stop groove (54).

3. An assembly (10) as set forth in claim 2 wherein said frame (38) is rectangular.

4. An assembly (10) as set forth in claim 2 wherein said frame (38) includes a pair of opposing slide ways (40).

5. An assembly (10) as set forth in claim 4 wherein said tooth (44) is disposed on said frame (38) below said slide ways (40).

6. An assembly (10) as set forth in claim 3 wherein said slider (26) includes a pair of opposing lateral tabs (42) slidably disposed in said slide ways (40) of said frame (38).

7. An assembly (10) as set forth in claim 6 wherein said slider (26) includes a pair of opposing transverse tabs (28).

8. An assembly (10) as set forth in claim 2 wherein said slider (26) includes a terminal receptacle (32).

9. An assembly (10) as set forth in claim 8 wherein said terminal receptacle (32) is insert molded.

10. An assembly (10) as set forth in claim 2 wherein said core element (14) includes a rigid extension (16) fixedly connected to said housing (20).

11. An assembly (10) as set forth in claim 2 wherein said housing (20) includes an interior track (24) in which said slider (26) is slidably retained.

12. A core length adjustment device (18) for a motion transmitting remote control assembly (10) for transmitting longitudinal forces along a curved path, said device (18) comprising:

a housing (20) having a plurality of teeth (22);

a slider (26) longitudinally moveable within said housing (20) between maximum and minimum length adjusted positions;

an interlock (36) having at least one tooth (44) transversely movable relative to said slider (26) between a shipping condition in which said tooth (44) is disengaged from said teeth (22) of said housing (20) and an engaged condition in which said tooth (44) engages said teeth (22) of said housing (20) to transfer longitudinal forces therebetween;

and characterized by serviceable retainer means (46) isolated from said longitudinal forces for automatically restraining said interlock (36) in said engaged condition and selectively releasing said interlock (36) to return to said shipping condition without unfavorable influences resulting from said longitudinal forces; said serviceable retainer means (46) including a cantilevered tang (48) having a cam foot (50);

said housing (20) including an interior track (24) in which said slider (26) is slidably retained;

said slider (26) including a ramping retainer surface (52).

13. A device (18) as set forth in claim 12 wherein said ramping retainer surface (52) includes a stop groove (54).

14. A device (18) as set forth in claim 13 wherein said interlock (36) includes a frame (38).

15. A device (18) as set forth in claim 14 wherein said frame (38) is rectangular, said cantilever tang (48) being disposed inside said frame (38).

16. A device (18) as set forth in claim 15 wherein said frame (38) includes a pair of opposing slide ways (40).

17. A device (18) as set forth in claim 16 wherein said tooth (44) is disposed on said frame (38) below said slide ways (40).

18. A device (18) as set forth in claim 17 wherein said slider (26) includes a pair of opposing lateral tabs (42) slidably disposed in said slide ways (40) of said frame (38).

19. A device (18) as set forth in claim 18 wherein said slider (26) includes a pair of opposing transverse tabs (28).

20. A device (18) as set forth in claim 13 wherein said slider (26) includes a terminal receptacle (32).

* * * * *